United States Patent
Shitomi

(10) Patent No.: US 8,391,703 B2
(45) Date of Patent: Mar. 5, 2013

(54) LENS UNIT, CAMERA BODY, CAMERA DEVICE, AND IMAGING METHOD

(75) Inventor: Takayuki Shitomi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 42 days.

(21) Appl. No.: 12/957,645

(22) Filed: Dec. 1, 2010

(65) Prior Publication Data

US 2011/0135293 A1    Jun. 9, 2011

(30) Foreign Application Priority Data

Dec. 4, 2009  (JP) ................................ 2009-276912

(51) Int. Cl.
*G03B 15/03* (2006.01)
(52) U.S. Cl. ........................ 396/176; 396/157
(58) Field of Classification Search ............... 396/56, 396/59, 157, 176, 180, 199, 529, 535, 541; 348/373, 374
See application file for complete search history.

(56) References Cited

U.S. PATENT DOCUMENTS

| 6,707,490 | B1* | 3/2004 | Kido et al. | 348/211.14 |
| 2002/0048457 | A1* | 4/2002 | Matsui | 396/157 |
| 2006/0034549 | A1 | 2/2006 | Tanaka et al. | |

FOREIGN PATENT DOCUMENTS

| JP | 2005-142831 | 6/2005 |
| JP | 2006-54709 | 2/2006 |
| JP | 3945052 | 7/2007 |
| JP | 2010-226708 A | 10/2010 |

* cited by examiner

*Primary Examiner* — Clayton E Laballe
*Assistant Examiner* — Minh Phan
(74) *Attorney, Agent, or Firm* — Oblon, Spivak, McClelland, Maier & Neustadt, L.L.P.

(57) ABSTRACT

A lens unit is detachably connected via a communication interface with a camera body having a strobe and constituting a camera device. The lens unit is configured to include an optical system including a lens; an imaging unit including an image sensor which photo-electrically converts light from a subject having transmitted through the lens; an image processor which generates image data from an output of the imaging unit; and a strobe controller which controls a flash operation of the strobe provided in the camera body in accordance with a release signal from the camera body.

12 Claims, 17 Drawing Sheets

| FIG. 6 | FIG. 6A | FIG. 6B |

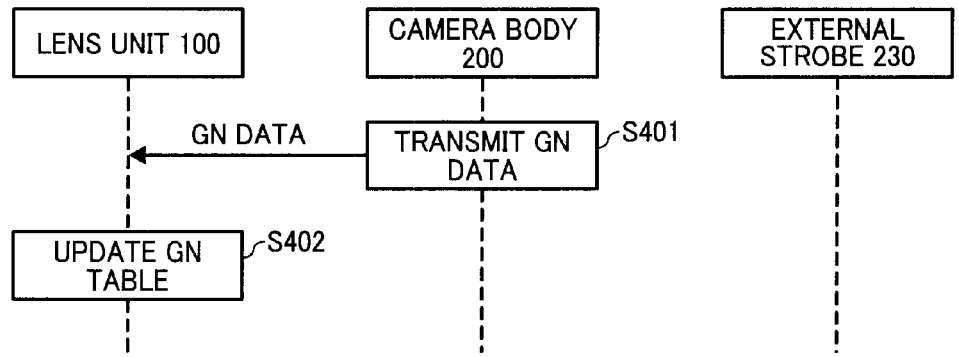
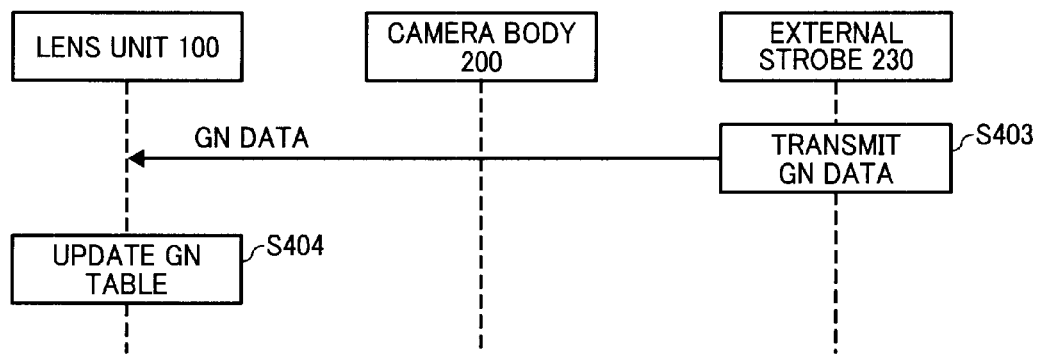
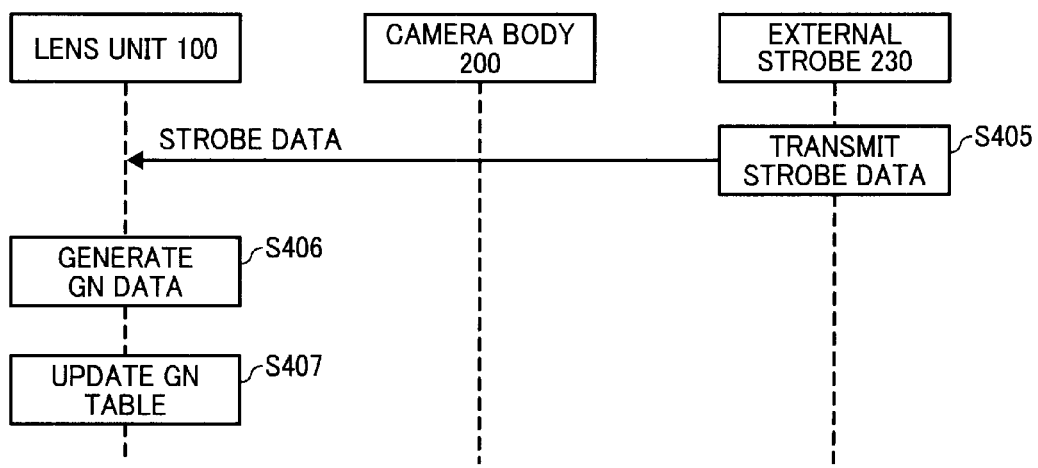

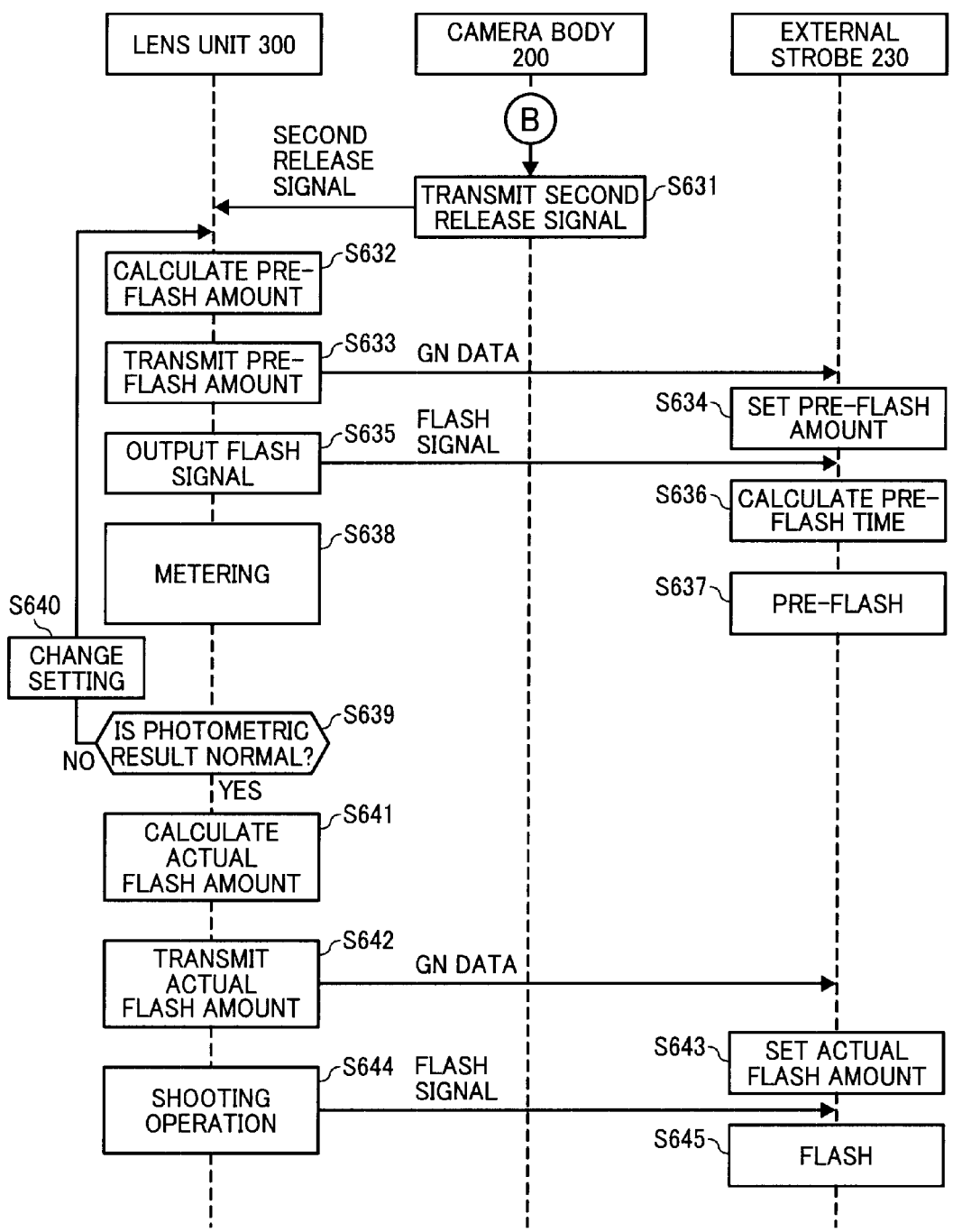

LENS UNIT, CAMERA BODY, CAMERA DEVICE, AND IMAGING METHOD

CROSS REFERENCE TO RELATED APPLICATION

The present application is based on and claims priority from Japanese Patent Application No. 2009-276912, filed on Dec. 4, 2009, the disclosure of which is hereby incorporated by reference in its entirety.

BACKGROUND OF THE INVENTION

1. Field of the Invention

The present invention relates to a lens unit which can perform flash control over a strobe, a camera body detachable from the lens unit, a camera device comprising the lens unit and the camera body, and an imaging method using such a camera device.

2. Description of the Prior Art

A type of camera device such as a digital camera incorporating a strobe or to which an external strobe is attached is well known. In case of a camera device comprising an interchangeable lens unit, the optimal property of the strobe for photographing differs depending on a combination of a lens unit used and an image sensor contained in the camera body. It is extremely difficult to incorporate a strobe or attach an external strobe suitable for all the lens units in/to the camera device.

In view of solving the above, Japanese Patent No. 3945052 (Reference 1) discloses an interchangeable lens unit type digital camera having a lens unit incorporating a strobe, and Japanese Patent Application Publication No. 2005-142831 (Reference 2) discloses a strobe unit of a digital camera configured to be replaceable with ones different properties.

In the digital camera disclosed in Reference 1, a strobe device can be selectively attached to each lens unit in accordance with a property of the lens unit. However, provision of a strobe device for each lens unit may increase the size and manufacture costs of the lens unit.

It is possible to select and mount an optimal strobe device for the digital camera disclosed in Reference 2. However, it requires preparation of different strobe devices with different properties in advance, resulting in an additional work for a user to change one strobe device to another one and increasing costs.

SUMMARY OF THE INVENTION

The present invention aims to provide a lens unit which comprises an imaging lens, an image sensor, and an image processor to be able to optimally control light emission of different strobe devices to be incorporated in or attached to a camera body. The present invention also aims to provide a camera body detachable from the lens unit, a camera device comprising the lens unit and the camera body, and an imaging method using such a camera device.

According to one aspect of the present invention, a lens unit detachably connected via a communication interface with a camera body having a strobe and constituting a camera device, comprises an optical system including a lens; an imaging unit including an image sensor which photo-electrically converts light from a subject having transmitted through the lens; an image processor which generates image data from an output of the imaging unit; and a strobe controller which controls a flash operation of the strobe provided in the camera body in accordance with a release signal from the camera body.

BRIEF DESCRIPTION OF THE DRAWINGS

The features, embodiments, and advantages of the present invention will become apparent from the following detailed description with reference to the accompanying drawings:

FIGS. 14A to 14C are sequence diagrams for other examples of the initial setting;

FIG. 17 is a sequence diagram for still another example of the shooting process.

DETAILED DESCRIPTION OF THE PREFERRED EMBODIMENTS

Figure 1A:
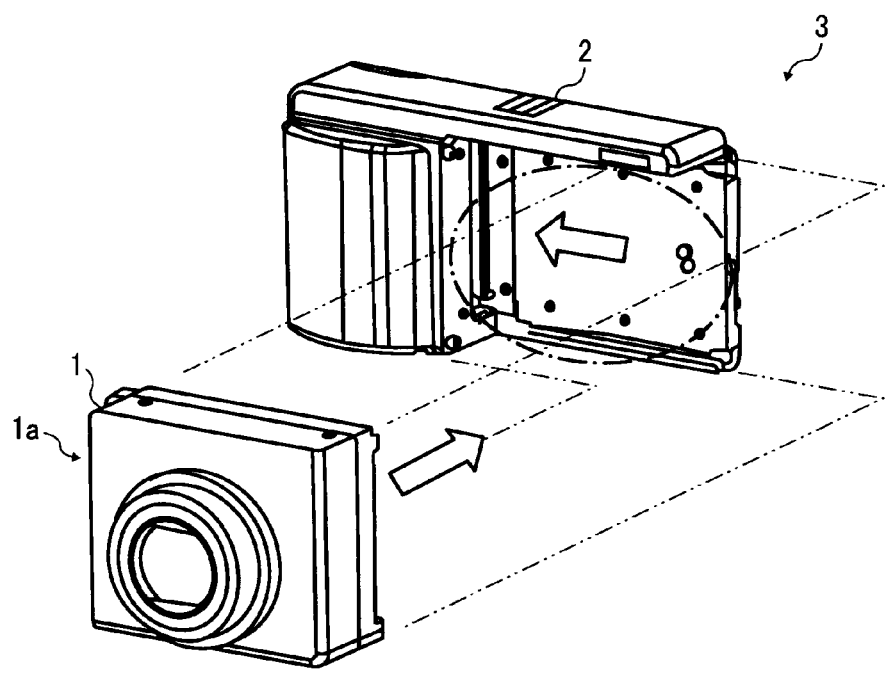
FIGS. 1A, 1B are perspective views of an example of a camera device according to one embodiment of the present invention.
Figure 1B:
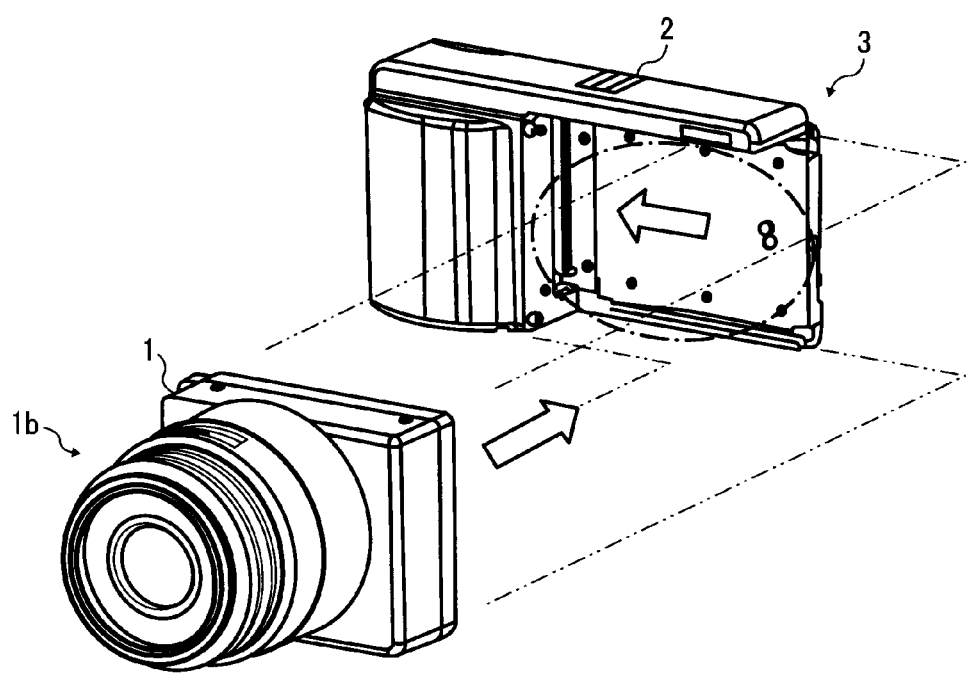

Hereinafter, embodiments of a lens unit, a camera body, a camera device comprising the lens unit and the camera body, and an imaging method using the camera device according to the present invention will be described in detail with reference to the accompanying drawings. FIGS. 1A, 1B show a lens unit 1, a camera body 2, and a camera device 3 including the lens unit 1 and the camera body 2 integrated with each other.

Various types of the lens unit 1 including different imaging lenses and image sensors are available and a user can select one of them according to his/her own needs and preference and attach it to the camera body 2. For example, by selecting a lens unit 1a (FIG. 1A) including a single focus lens or a lens unit 1b (FIG. 1B) including a zoom lens, a user can take advantage of the features of each lens to perform a photo shooting.

Figure 2:
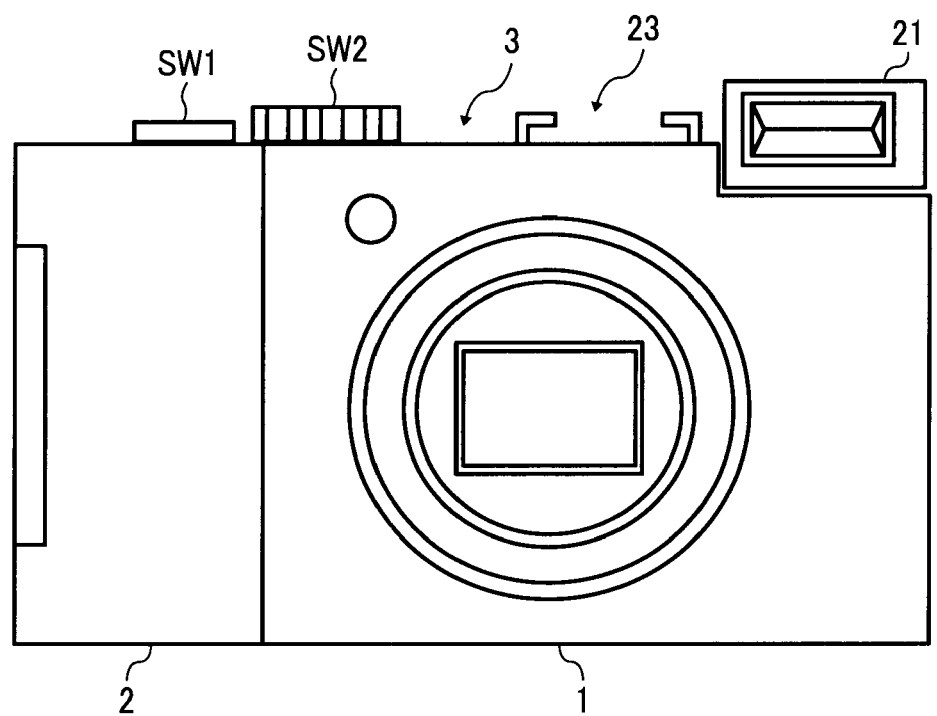
FIG. 2 is a front view of the camera device.

FIG. 2 is a front view of the camera device 3 which comprises an imaging lens around the center of the lens unit 1 and an internal strobe 21 at the top of the camera body 2.

Figure 3:
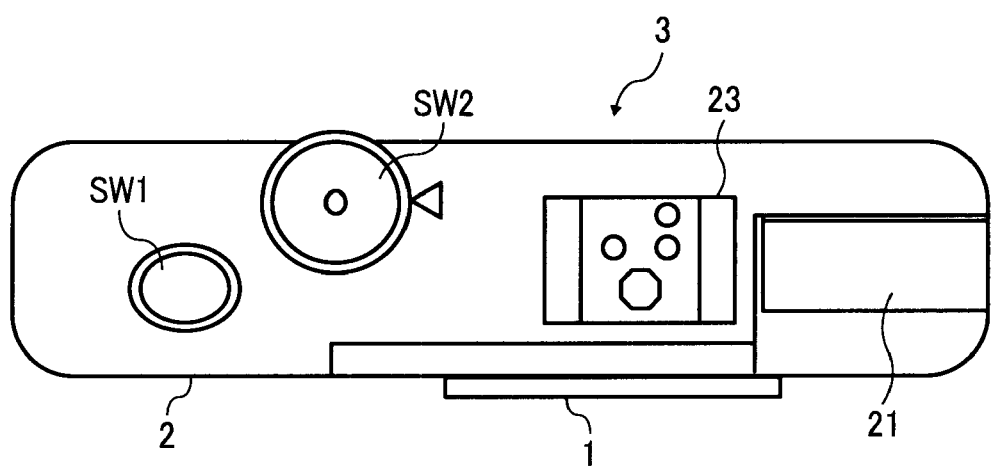
FIG. 3 is a top view of the camera device.

FIG. 3 is a top view of the camera device 3 which comprises, on the top of the camera body 2, a release button SW1, a mode dial SW2 to set a focusing mode or a shooting mode, and a hot shoe 23 to fix an external strobe as a communication interface between the camera body 2 and the external strobe.

Figure 4A:
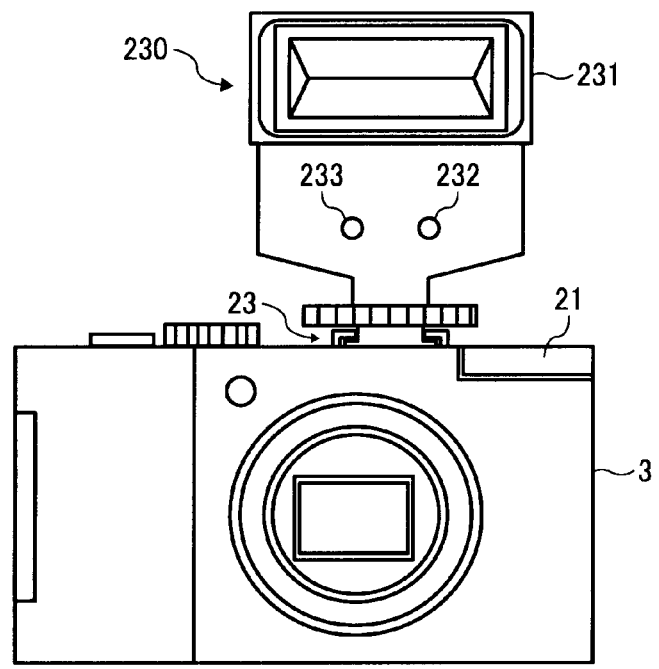
FIGS. 4A, 4B are a front view and a back view of an example of the camera device to which an external strobe is attached, respectively.
Figure 4B:
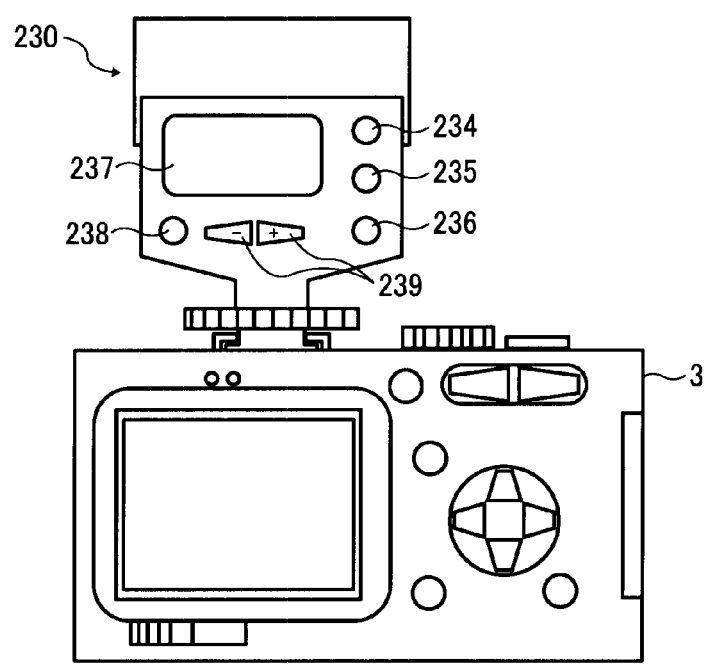

FIGS. 4A, 4B show an example of the camera device 3 to which an external strobe is attached according to one embodiment of the present invention. FIG. 4A is a front view of the camera device with an external strobe 230 attached which comprises, on the front face, a flash portion 231 producing flashes of light to a subject, an automatic flash sensor 232 which operates in an automatic flash mode, and an AF supplementary sensor 233 for auto exposure. The flash sensor 232 is a sensor to receive light emitted from the flash portion 231 and reflected from a subject and to generate currents by photo-electrically conversion. The currents generated by the flash sensor 232 are integrated by a not-shown integration condenser which stops the flash operation of the external strobe 230 when the charge amount reaches a predetermined value.

Further, the external strobe 230 incorporates a CPU and a memory which make it possible to perform predetermined flash control of the external strobe 230 using a guide number (GN) informed by the lens unit 1, as described later.

The back face of the camera device 3 on which the external strobe 230 is mounted is shown in FIG. 4B. The external strobe 230 in the drawing comprises a battery lamp 234 which indicates completion of charging the flash portion 231, a power switch 235, a test flash switch 236, an LCD 237, a mode switch 238, and a setting selection switch 239.

Upon a manipulation to the power switch 235 to turn on, the external strobe 230 starts charging a main condenser and continues it until the condenser reaches a predetermined voltage. It stops charging when the condenser reaches the predetermined voltage and turns on the battery lamp 234. By pressing the test flash switch 236 at the completion of charging, a user can check up a flash operation.

The external strobe 230 comprises a plurality of flash modes. A user can set a desired mode by manipulating the mode switch 28 and setting selection switch 239. A flash operation of the strobe 230 is controlled in accordance with the set flash mode. For example, in a manual flash mode, flash amount can be set by 0.5 EV.

The external strobe 230 also comprises a flash correction function to set the flash amount by 0.5 EV within a range of ±2.0 EV, for example. In the automatic flash mode F-number can be set in four levels of F2.8, F4, F5.6, and F8.

The flash portion 231 includes a not-shown an angular changing system which can change the irradiation angle of the strobe light. Therefore, it can effectively illuminate a subject when the subject is shot with a zoom lens.

A user can set parameters for the flash modes and flash control and check the setting on the LCD 237 by manipulating the mode switch 238 and setting selection switch 239 of the external strobe 230.

Figure 5:
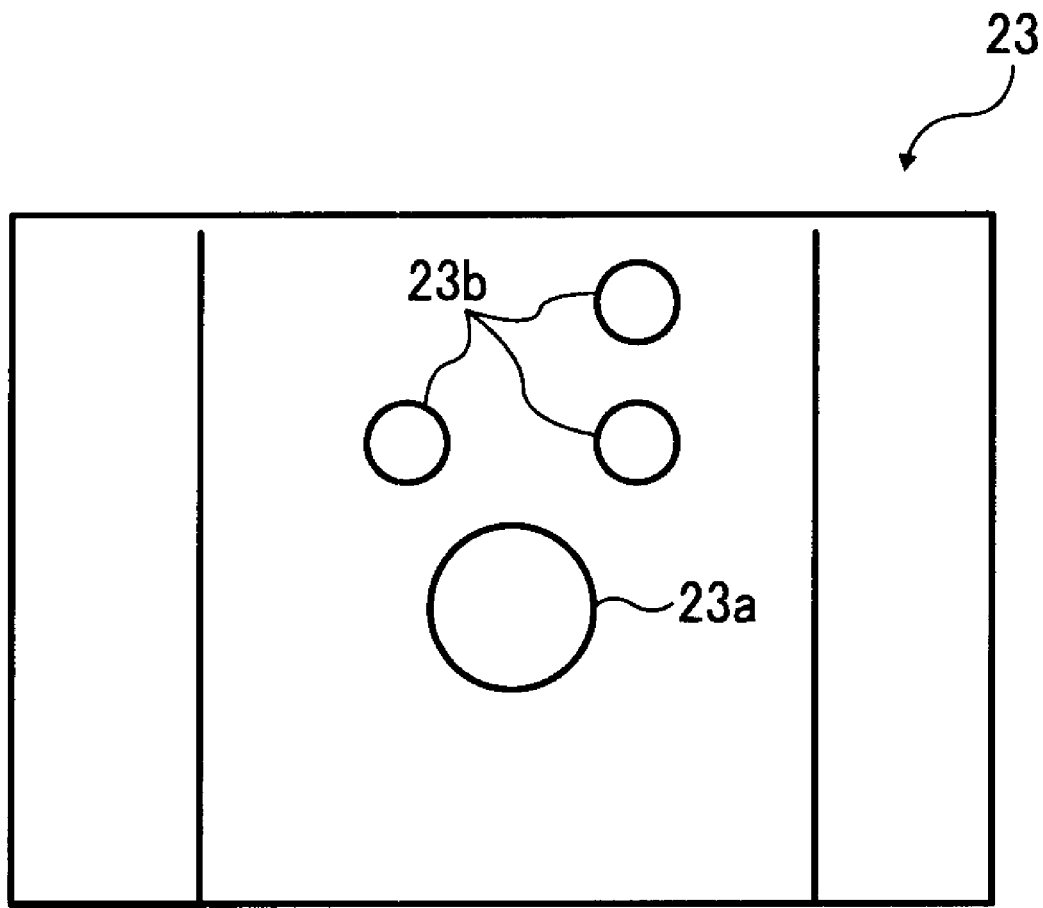
FIG. 5 is a plan view of one example of an external strobe interface included in the camera device.

The external strobe 230 is attached to the camera device 3 via the hot shoe 23. FIG. 5 is an enlarged view of the top face of the hot shoe 23 which comprises, at the center, an X-contact point 23a outputting a later-described flash signal in response to an instruction from the lens unit 1 to the external strobe 230 and a plurality of communication terminals 23b to receive GN data indicating a flash amount from the lens unit 1. The camera device 3 and the external strobe 230 are electrically connected with each other via the hot shoe 23 when the external strobe 230 is attached to the camera device 3. The flash signal from the camera device 3 is transmitted to the external strobe 230 via the X-contact point 23a to allow the external strobe 230 to perform a predetermined flash operation in synchronization with a shutter operation. Also, in accordance with data on flash setting transmitted via the communication terminals 23b, a predetermined flash control is executed.

Next, an example of hardware structures of the lens unit and the camera body is described with reference to FIG. 6.

Figure 6A:
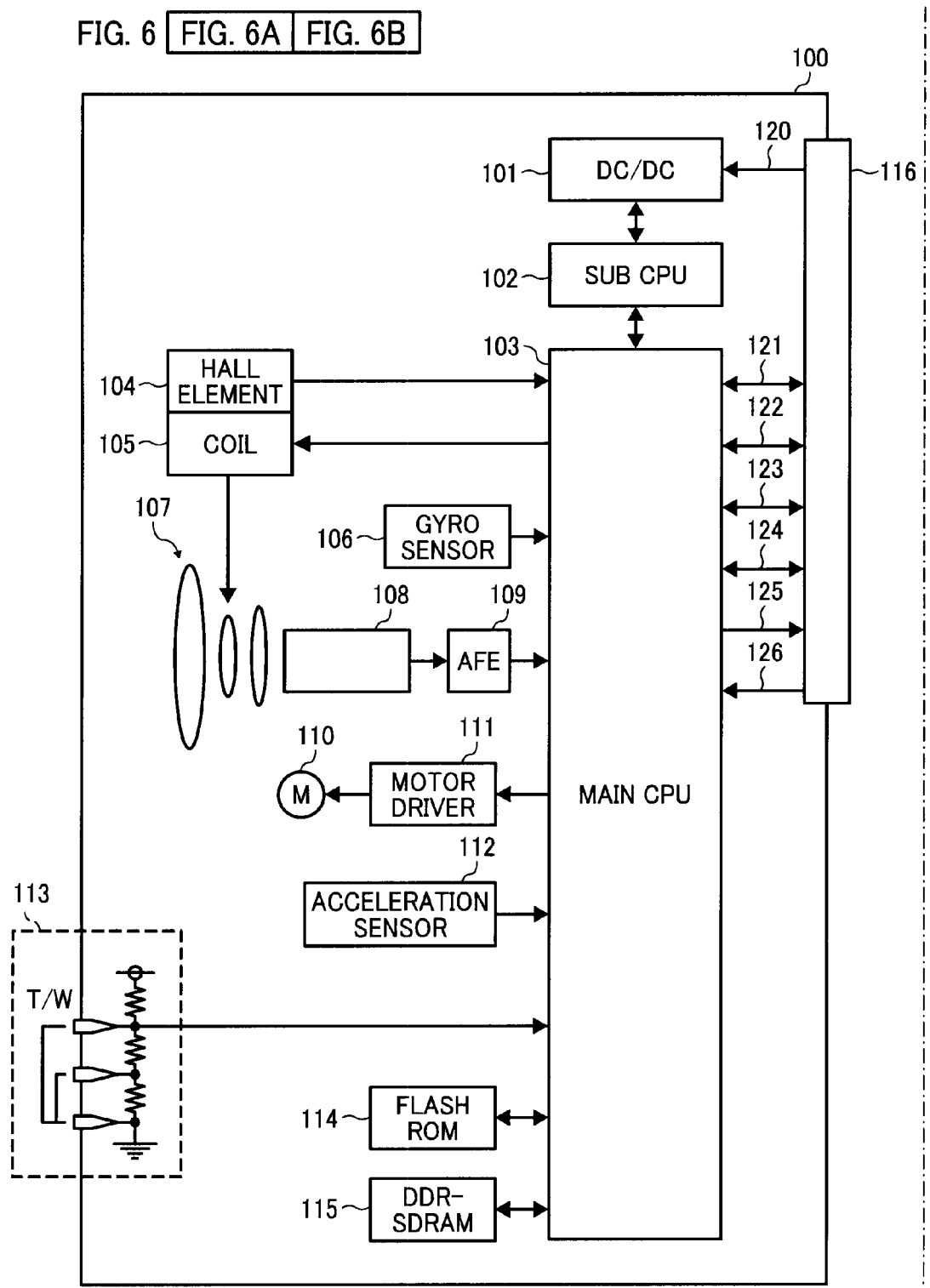
FIG. 6 shows one example of a hardware structure of a lens unit and a camera body constituting the camera device.
Figure 6B:
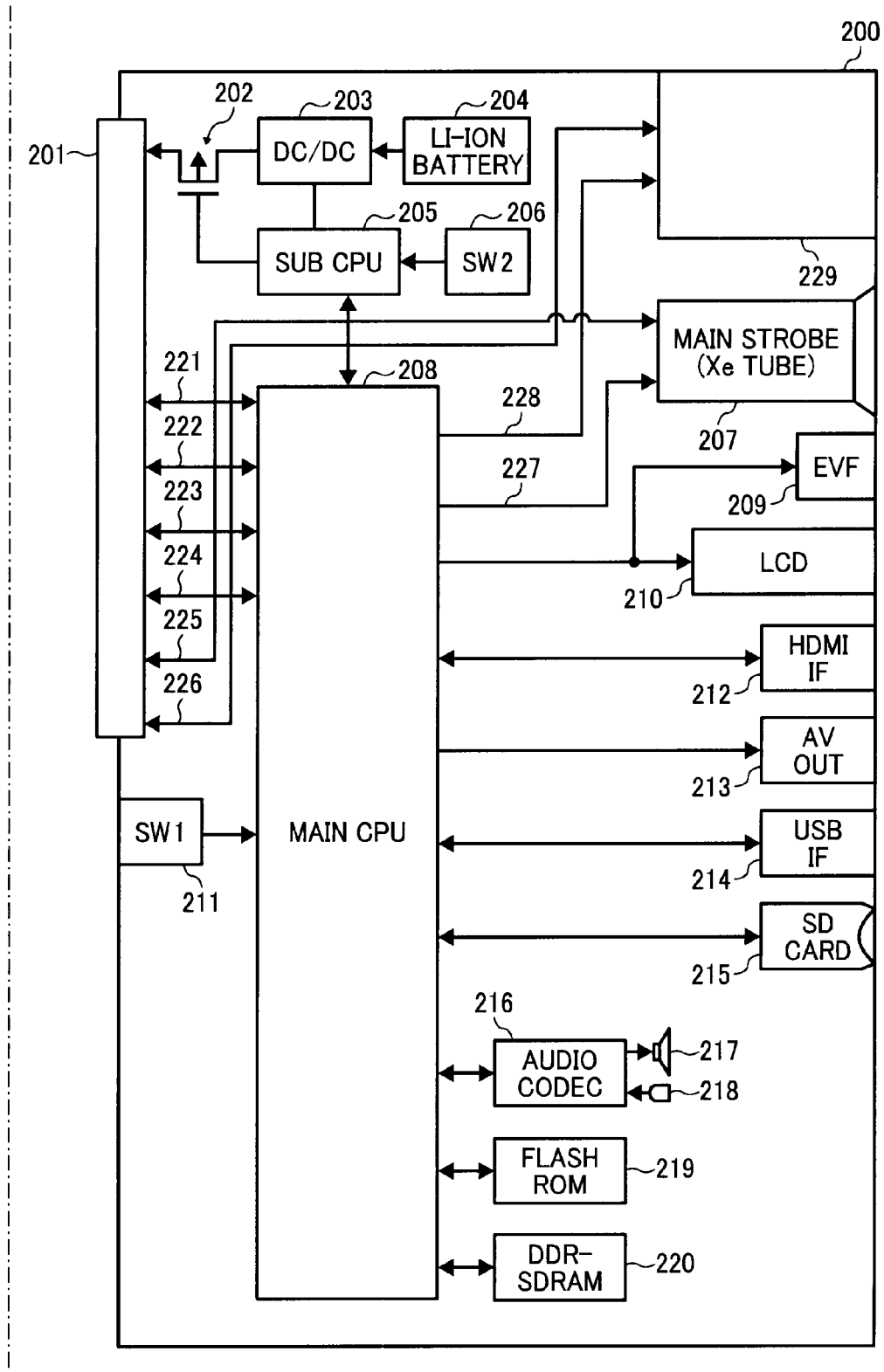

As shown in FIG. 6, a lens unit 100 and a camera body 200 are electrically connected via a connector 116 of the lens unit 100 and a connector 201 of the camera body 200 to constitute the camera device 3. The lens unit 100 comprises an optical system 107 including a plurality of lens groups with a focus lens, an image sensor 108 photo-electrically converting an optical image of a subject captured via the optical system 107 into an electric signal for output, an analog front end (AFE) 109 converting an analog image signal from the image sensor 108 into a digital image signal and amplifying the signal, and a main CPU 103 executing predetermined image processing on the digital image signal to generate image data. The predetermined image processing includes RGB-YUV data conversion, data compression by which the converted YUV data is compressed and coded in JPEG or MPEG format, and RAW data generation. The main CPU 103 is a so-called image processing engine of the lens unit 100. The image sensor 108 and the AFE 109 constitute an imaging unit while the main CPU 103 and a software program stored in a later described ROM 114 constitute an image processor.

The lens unit 100 further comprises a unit interface electrically connecting with the camera body 200. The unit interface includes a joint connector 116 connecting with a joint connector 201 of the camera body 200, a first interface 121 for a control signal, a second interface 122 for a serial signal, a third interface 123 for bi-directional communication, a fourth interface 124 for an SDIO signal, a fifth interface 125 for a flash signal to the internal strobe, and a sixth interface 126 for a flash signal to the external strobe.

Further, the lens unit 100 comprises a motor driver 111 controlling a motor 110 to drive a lens barrel of the lens groups of the optical system 107. The motor driver 111 is controlled by a control signal received from the camera body 200 via the first interface 121. This allows the motor driver 111 to perform various operations such as accommodating the lens barrel of a certain type of the interchangeable lens upon power-off of the camera device 3 or magnification change of the lens upon press to a not-shown button.

The lens unit 100 also comprises a DC-DC converter 101 which is supplied with power 120 from the camera body 200 and generates necessary power for operation of the lens unit 100, and a sub microcomputer 102 which detects the power 120 and controls the DC-DC converter 101.

The lens unit 100 also comprises a detection circuit 113 detecting a telephoto-converter lens and a wide-converter lens which are attachable to the exterior of the lens unit 100.

The lens unit 100 also comprises a gyro sensor 106 detecting an inclination of the camera device 3, an acceleration sensor 112 detecting an acceleration velocity of the camera device 3, a coil 105 driving the lens groups 107 according to the inclination and acceleration velocity detected by the gyro sensor 106 and the acceleration sensor 112, and a hall element 104 detecting a drive amount of the coil 105. These elements function as a camera shake preventing mechanism.

A software program to execute flash control operation and else in the lens unit 100 is stored in a flash ROM (hereinafter, ROM) 114. Also, a DDR-SDRAM (hereinafter, RAM) 115 is provided in the lens unit 100 and it functions as a link buffer in which image data generated by the main CPU 103 via the image sensor 108 is stored and as a work area for the software program.

In FIG. 6 the camera body 200 comprises a unit interface electrically connecting with the lens unit 100. The unit interface includes a joint connector 201 connecting with the joint connector 116 of the lens unit 100, a first interface 221 for a control signal, a second interface 222 for a serial signal, a third interface 223 for bi-directional communication, a fourth interface 224 for an SDIO signal, a fifth interface 225 for a flash signal to the internal strobe, and a sixth interface 226 for a flash signal to the external strobe.

The camera body 200 comprises a main CPU 208 executing predetermined image processing on the image data received from the lens unit 100 when appropriate. The predetermined image processing includes YUV data conversion, data compression by which the converted YUV data is compressed and coded in JPEG or MPEG format, data decompression, and RAW data generation. The main CPU 208 is an image processing engine of the camera body 200.

The camera body 200 also comprises a release switch 211 generating a release signal for starting a shooting operation of the camera device 3, an operation switch 206 such as a cross key for setting an operation mode of the camera device 3 and the like, a power switch 202 for making various settings according to an input from the operation switch 206, controlling power source supplied from a lithium battery 204 using the DC-DC converter 203 and supplying power to the lens unit 100, and a sub microcomputer 205 controlling these switches.

A software program to execute image processing and operation control in the camera body 200 is stored in a flash ROM (hereinafter, ROM) 219. Also, a DDR-SDRAM (hereinafter, RAM) 220 is provided in the camera body 200 and it functions as a work area for the image processing.

The camera body 200 also comprises an audio codec 216, a microphone 218 inputting an audio signal to the audio codec 216, a speaker 217 outputting audio from the audio codec 216, a USB interface connector 214, an AV output connector 213, an output interface 212 for an HDMI signal, an SD memory 215 detachably storing an image file, an internal strobe 207, an LCD 210 and an electronic view finder (EVF) 209 displaying a preview image during focusing by a manipulation to the operation switch 211 and captured image data in shooting, and an external strobe interface 229 to attach the external strobe to the camera body 200.

The internal strobe 207 in the camera body 200 is configured to generate flashes of light in accordance with a flash control signal from the lens unit 100. Note that the ROM 114 of the lens unit 100 is a storage medium to store operation control data for the internal strobe 207 or the external strobe attached to the camera body 200.

Figure 7:
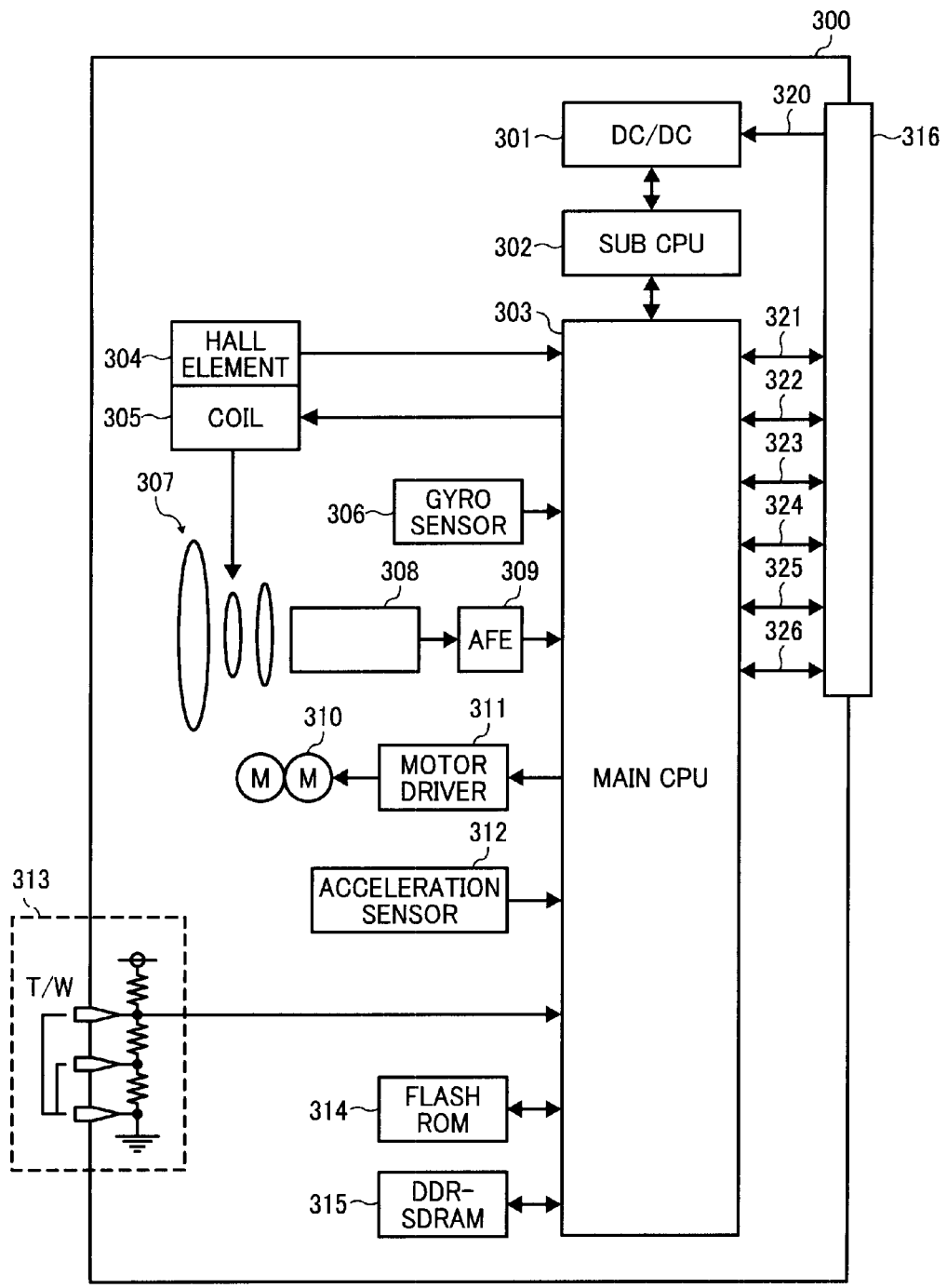
FIG. 7 shows another example of a hardware structure of a lens unit.

FIG. 7 shows another example of structure of the lens unit constituting the camera device. A lens unit 300 in FIG. 7 has almost the same structure as the lens unit 100 in FIG. 6. A difference in between them is a lens group 307 including a zoom lens and a zoom lens motor 310 to drive the zoom lens. The lens unit 300 is configured to drive the focus lens and the zoom lens of the lens group 307 in a predetermined manner in accordance with a manipulation to a not-shown zoom switch of the camera body 200.

Figure 8:
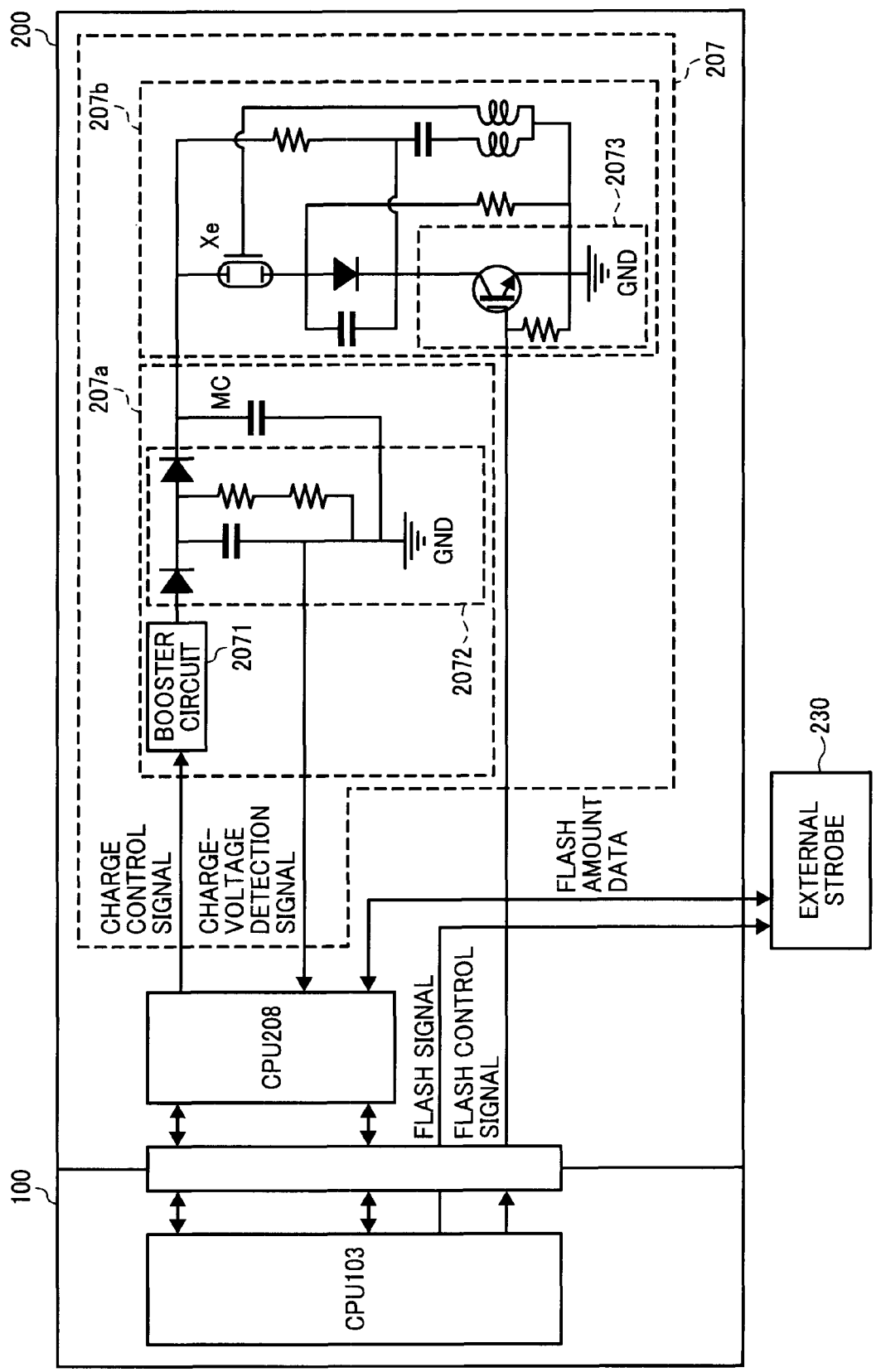
FIG. 8 is a circuit diagram of one example of an internal strobe of the camera body.

FIG. 8 is a circuit diagram of the internal strobe 207 of the camera device 3 and the external strobe 230 attached to the external strobe I/F 229. In the drawing the internal strobe 207 comprises a charge controller 207a to accumulate charge in a main condenser MC, a flash controller 207b including an xenon tube Xe to emit light by power accumulated in the main condenser MC to control flashing.

The charge controller 207a includes the main condenser MC accumulating luminescence energy, a booster circuit 2071 which boosts a charge voltage of the main condenser MC to an emission voltage of the xenon tube Xe, and a voltage detection circuit 2072 which detects a voltage value of the power charged in the main condenser MC. The main condenser MC is charged by controlling the operation of the booster circuit 2071 while checking a result of detection by the voltage detection circuit 2072.

The flash controller 207b comprises a switching circuit 2073 including a switch element to control a flash start and a flash stop. The switch element operates by a flash control signal (flash start signal) from the main CPU 103 of the lens unit 100 to form a discharge path between the main condenser MC and the xenon tube Xe, generate a high voltage in a secondary winding of a trigger transformer and apply a trigger voltage to the xenon tube Xe to start discharge. Receiving the flash control signal, the switch element stops the xenon tube Xe to emit light by intercepting the discharge path.

The camera device according to one embodiment of the present invention is configured to control the operation of the charge controller 207a with the main CPU 208 of the camera body 20 and notify completion/non-completion of the charge from the main CPU 208 to the main CPU 103 of the lens unit 100 via the bi-direction interfaces 223 and 123. The flash start and stop of the flash controller 207b is controlled by the main CPU 103 of the lens unit 100. Specifically, a dedicated signal line is directly connected with the switching circuit 2073 via a communication port comprised of the fifth interfaces 125, 225 of the lens unit 100 and the camera body 200, to control the operation of the switching circuit 2073 by an instruction from the lens unit 100 and control the flash operation of the internal strobe 207.

Further, when the external strobe 230 is connected with the I/F 229 of the camera body 200, the main CPU 208 of the camera body 200 notifies the main CPU 103 of the lens unit 100 of the connection. The lens unit 100 is configured to transmit flash amount data and a flash signal to the external strobe 230 according to a release signal which is issued in response to a predetermined manipulation to the release switch 211 of the camera body 200.

Upon a half press to the release switch 211, for example, the optical system, imaging unit, and image processor perform autofocus (AF) and auto exposure (AE). Then, flash amount data indicating a necessary flash amount for shooting is transmitted from the lens unit 100 to the main CPU 208 of the camera body 200 via a communication port of the communication interfaces 123, 223 and transmitted to the external strobe 230. Upon a full press to the release switch 211, a flash signal is directly transmitted from the lens unit 100 and the external strobe 230 via a communication port of the communication interfaces 126, 226. Thus, the external strobe 230 can generate flashes of light based on flash amount data received in advance from the lens unit 100.

First Embodiment

Figure 9:
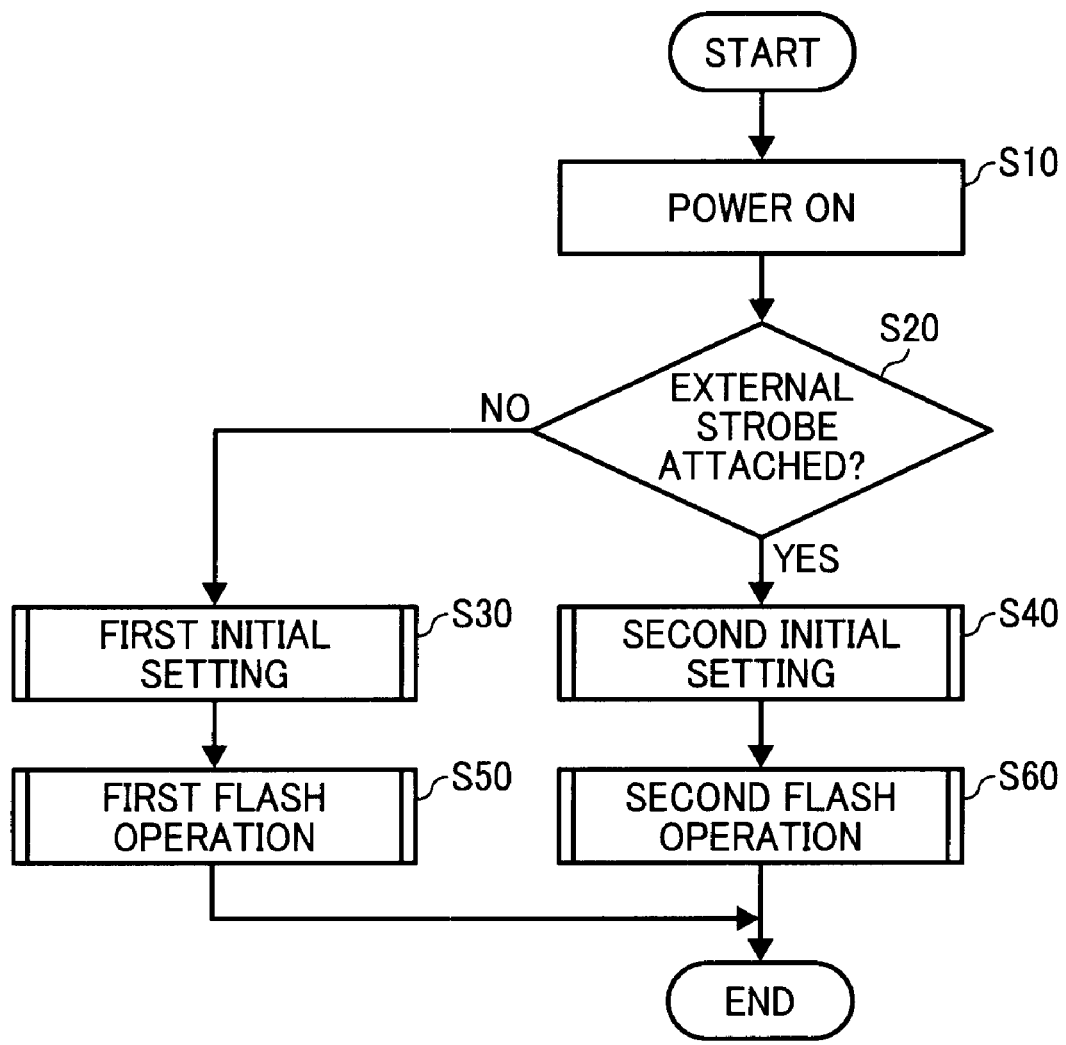
FIG. 9 is a flowchart for one example of an imaging method using the camera device.

Next, an example of an imaging method executed by the camera device 3 is described. FIG. 9 is a flowchart for controlling emission of strobe light in an imaging operation according to the present embodiment. Upon power-on of the camera device 3 in step S10, a determination is made on whether or not the external strobe 230 is attached in step S20. With the external strobe 230 not attached (No in step S20), a first initial setting is done in step S30 and then a first flash operation is performed in step S50. With the external strobe 230 attached (Yes in step S20), a second initial setting is done in step S40 and then a second flash operation is performed in step S60.

Figure 10A:
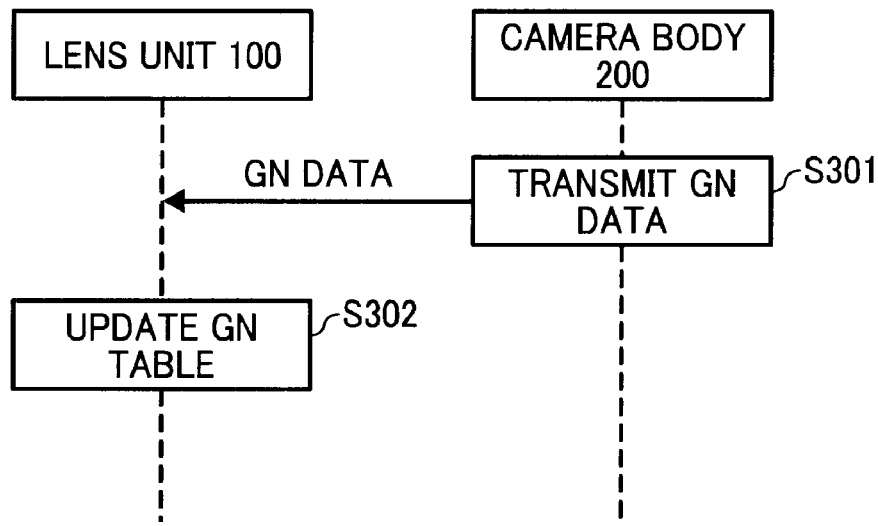
FIGS. 10A, 10B are sequence diagrams for one example of initial setting in the imaging method.
Figure 10B:
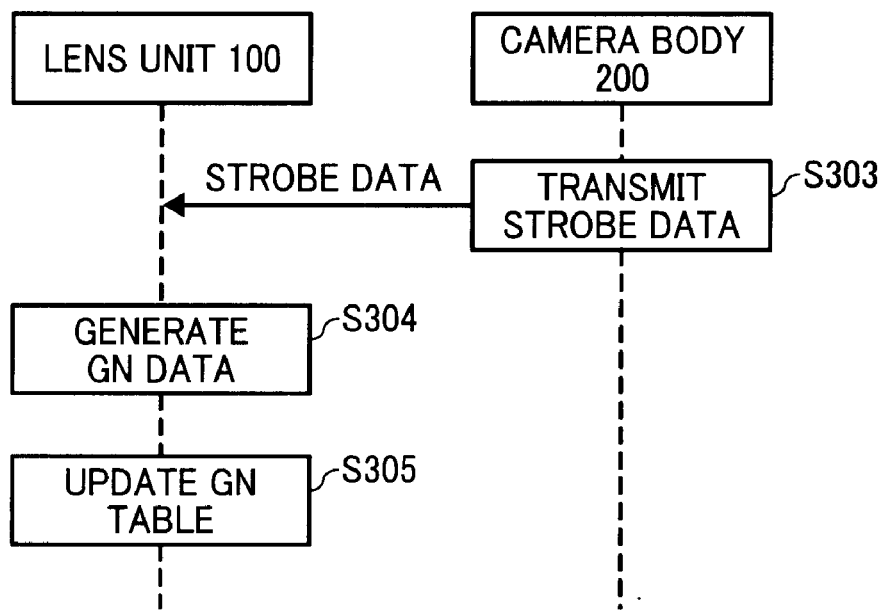

FIGS. 10A, 10B are sequence diagrams for showing the first initial setting in detail. In FIG. 10A GN data is transmitted from the camera body 200 to the lens unit 10 in step S301. The lens unit 100 reads a GN table pre-stored in the ROM 114, updates the GN table with the transmitted GN data, and store it in the RAM 115 in step S302.

Herein, the GN data refers to data containing flash time for determining a flash amount of the internal strobe associated with a guide number (GN) while the GN table refers to a list of a plurality of items of GN data. The GN is a value obtained by multiplying an F-number by a subject distance when sensitivity of the image sensor 108 is about ISO 100 and is used for flash control over the strobe device. GN data suitable for specification or a property of the internal strobe 207 is stored in the ROM 219 of the camera body 200 in order to optimally control the flash operation of the internal strobe 207. Transmitting the read GN data from the ROM 219 to the lens unit 100 in step S301 makes it possible for the lens unit 100 to optimally control the internal strobe 207 to flash.

Second Embodiment

Another example of the first initial setting is described with reference to FIG. 10B. As described above, the GN data is a value calculated by an F-number of the optical system and a subject distance. The flash time associated with each guide number differs depending on specification of the strobe. With the above taken in consideration, in step S303 the camera body 200 transmits specification data of the internal strobe (strobe data) to the lens unit 100 instead of GN data. In step S304 the lens unit 100 generates GN data based on the strobe data. In step S305 the lens unit 100 updates the GN table with the generated GN data and store it in the RAM 115.

Thus, when the camera device is configured to detachably include an internal strobe in the camera body 200 and a different internal strobe is attached, the lens unit 100 generates GN data based on the strobe data so that it can optimally control flash operation of the attached internal strobe in line with the specification of the internal strobe.

Third Embodiment

Figure 11:
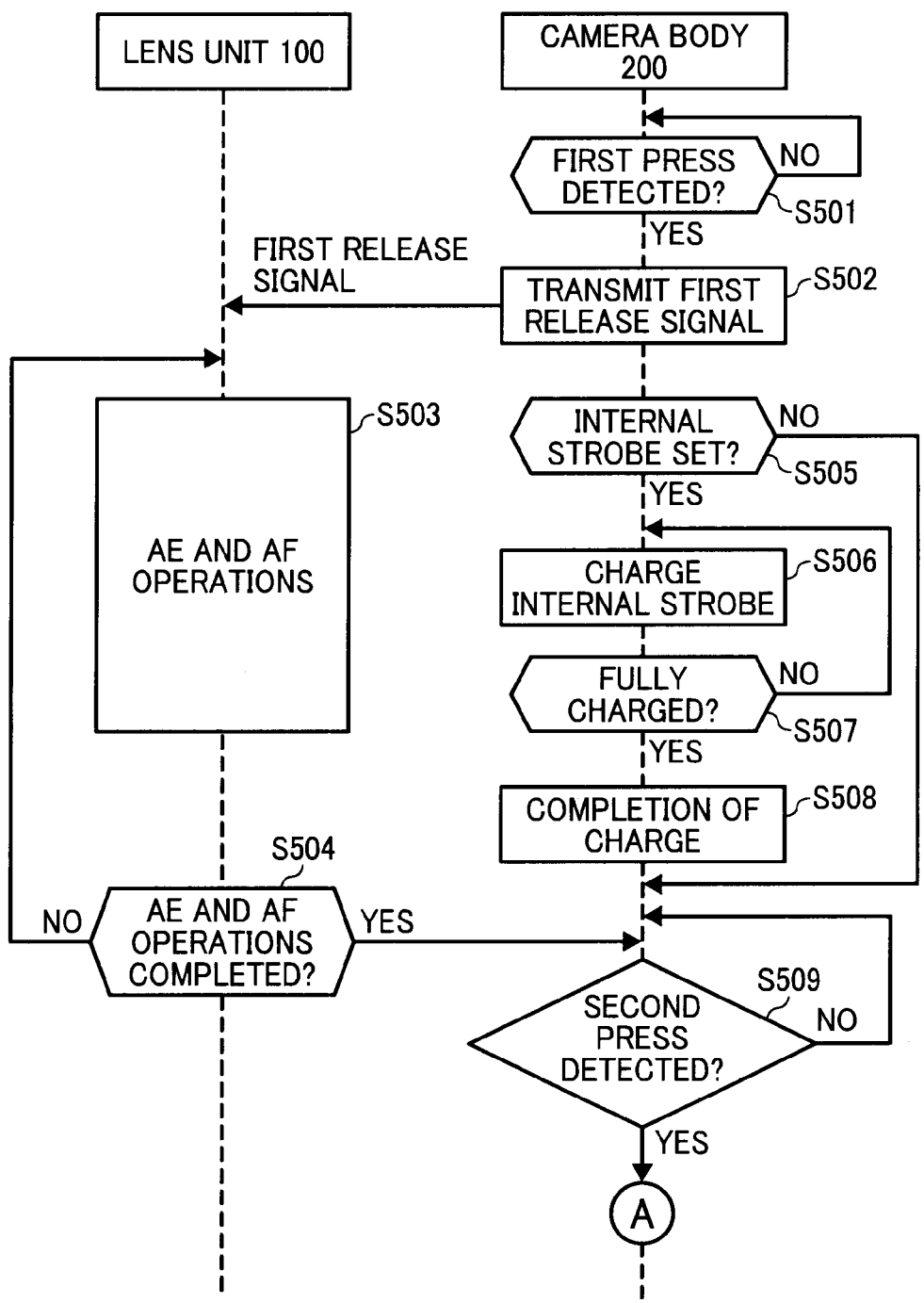
FIG. 11 is a sequence diagram for one example of flash operation in the imaging method.

Next, the first flash operation after the first initial setting is described in detail with reference to FIG. 11. First, when a half-press to the release switch 211 (hereinafter, first press) is detected (Yes in step S501), the first release signal is transmitted from the camera body 200 to the lens unit 100 in step S502. Upon receiving the first release signal, the lens unit 100 repetitively performs auto exposure and autofocus operations in step S503. Completion of the operations is determined in step S504. At completion of the auto exposure and autofocus, the lens unit 100 notifies the camera body 200 of the completion (Yes in step S504).

After transmitting the first release signal, the camera body 200 determines whether or not the internal strobe 207 is set based on setting information predetermined by a user in step S505. When the internal strobe 207 is properly set (Yes in step S505), the main CPU 208 of the camera body 200 transmits a charge control signal to the charge controller 207a (FIG. 8) to charge the internal strobe 207 in step S506.

The voltage detection circuit 2072 (FIG. 8) detects the charge amount of the main condenser MC and transmits a charge-voltage detection signal to the main CPU 208. The camera body 200 determines whether or not the main condenser MC is fully charged in step S507 according to the charge-voltage detection signal. Until it is fully charged, the charging is continued (No in step S507).

When the internal strobe 207 is fully charged (Yes in step S507), the charging is stopped in step S508. Then, upon given the notification of the AE and AF completion or detection of a full press to the release switch 211 (hereinafter, second press) (Yes in step S509), the camera body 200 proceeds to the next process. Without detection of the second press (No in step S509), the camera body waits for the detection.

Fourth Embodiment

Figure 12:
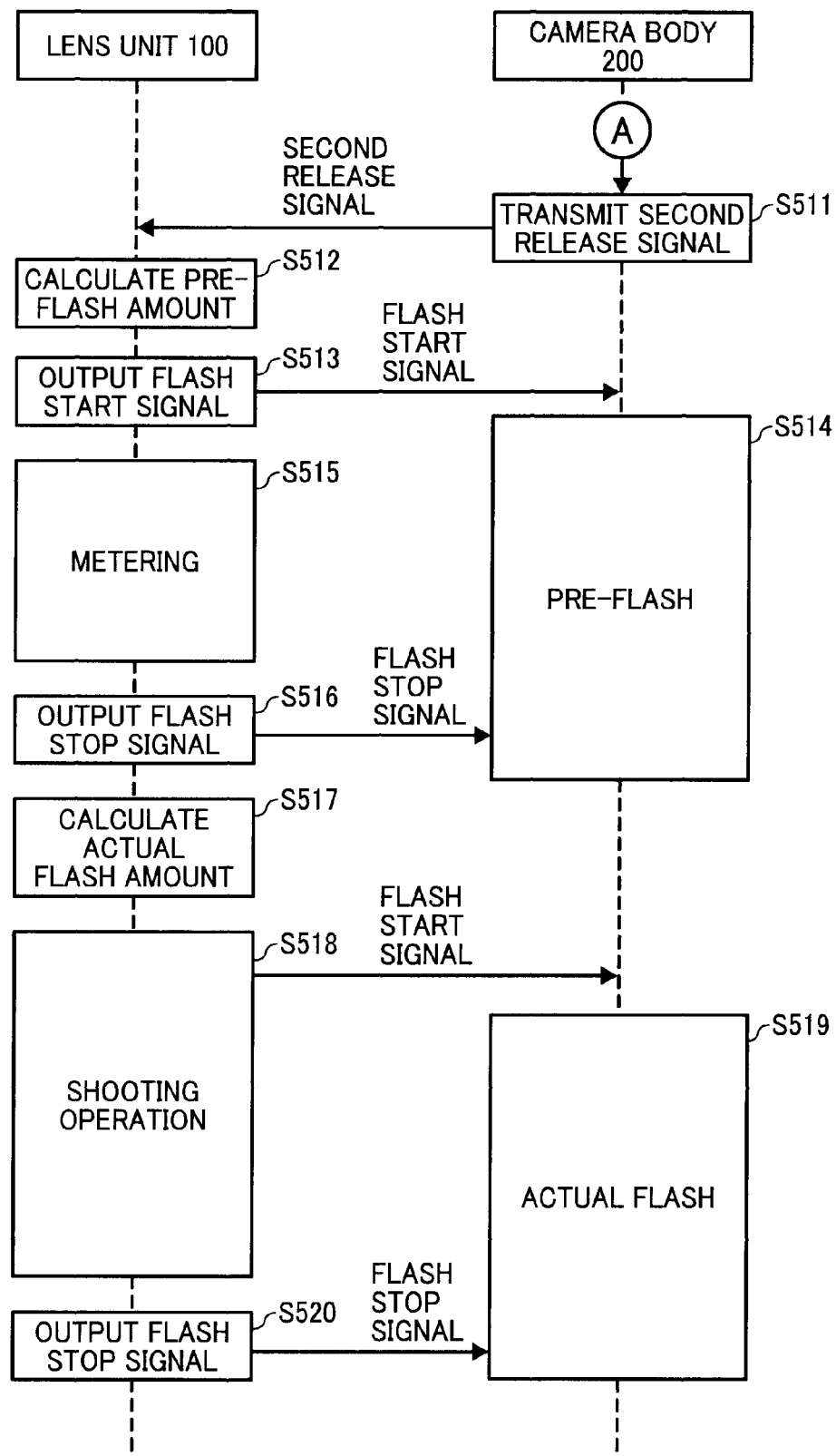
FIG. 12 is a sequence diagram for one example of shooting operation in the imaging method.

A process following the step S 509 is described with reference to FIG. 12. Upon detection of the second press, the camera body 20 transmits a second release signal to the lens unit 100 in step S511.

The lens unit 100 calculates a pre-flash amount in accordance with the second release signal in step S512. Specifically, the lens unit 100 calculates an optimal GN using a subject distance obtained by the AF operation in step S508 and reads a flash time corresponding to the calculated GN from the GN table in the RAM 115. The GN is numeric data obtained by multiplying an F-number of the optical system 107 by a subject distance when sensitivity of the image sensor 108 is about ISO 100 as described above. It can be calculated from distance data measured in step S508 and a property (F-number or the like) of the lens unit 100.

In step S513 the lens unit 100 transmits the flash start signal to the camera body 200. The flash start signal is directly transmitted to the internal strobe 207 without the main CPU 208 of the camera body 200. Upon receiving the flash start signal, the internal strobe 207 pre-flashes in step S514. After outputting the flash start signal, the lens unit 100 starts performing metering to an optical image of a subject captured via the optical system 107 using a photometer constituted by the imaging unit and the image processor in step S515.

The lens unit 100 counts a length of time from the transmittance of the flash start signal, and transmits a flash stop signal to the camera body 200 in step S516 when the count time reaches the calculated flash time in step S512.

Then, the lens unit 100 calculates a GN as a flash amount of an actual flash from a result of the metering in step S515 and an actual flash time from the GN table in the storage medium in step S517. In step S518 the lens unit 100 starts a shooting operation. Concurrently with or after the start of the shooting operation, the flash start signal is directly transmitted from the lens unit 100 to the internal strobe 207 without the main CPU 208 of the camera body 200. Receiving the flash start signal, the internal strobe 207 emits a flash in step S519.

In the shooting operation of the lens unit 100 in step S518, the imaging unit outputs image data based on an optical image of a subject received via the optical system, and the image processor performs predetermined image processing to the image data to generate an image file, and transmits the image file to the camera body via the communication interface. The image file is stored in the camera body.

The lens unit 100 counts a length of time from the transmittance of the flash start signal, and transmits a flash stop signal to the camera body 200 in step S520 when the count time reaches the calculated flash time in step S517.

Thus, with the camera device 3 according to one embodiment of the present invention, it makes possible for the lens unit 100 to control the internal strobe 207 in the camera body 200 to pre-flash or flash without the main CPU 208 of the camera body 200.

Moreover, since the lens unit 100 is configured to include the optical system, the imaging unit having an image sensor, and the image processor, the camera device 3, unlike the prior art interchangeable lens type camera device, can prevent disadvantageous effects on image quality due to lens aberration or shading of the image sensor.

Further, according to the camera device in one embodiment of the present invention, the lens unit is configured to include the image processor so that it can process image data of a subject alone. Accordingly, in shooting with use of a strobe, each lens unit can optimally control the flash operation of the strobe. Furthermore, the camera device can flexibly deal with a change in flash condition occurring due to a change of the lens unit. It can also control, with the lens unit, a strobe provided in the camera body and common to all of lens units used and perform an appropriate flash control over the common strobe in accordance with the lens unit in use.

Fifth Embodiment

Next, another example of the process in the forth embodiment is described with reference to FIG. 13.

The camera device according to one embodiment of the present invention is configured that different lens units are attachable to a single camera body. In a case where a lens unit with a zoom lens is attached, it is necessary to perform flash control over the strobe in a longer distance since focal length is more variable and shooting distance is longer in such a lens unit than in a lens unit with a single focus lens. However, with use of an image sensor in a small dynamic range, a distance that it can measure from a pre-flash is short. And, it is very difficult to calculate an actual flash amount needed for a range of near to far distances from a single pre-flash, especially when the lens unit attached incorporates a high magnification zoom lens.

The present embodiment will describe an example of optimally performing a flash control in the camera device 3 including the lens unit 300 with a zoom function. A description will be made on an example in which pre-flash control is performed a plurality of times after detection of the second press in the fourth embodiment.

Upon detection of the second press (step S509 of FIG. 11), the camera body 200 transmits the second release signal to the lens unit 300 in step S522.

The lens unit 300 calculates a pre-flash amount in accordance with the second release signal in step S523. Specifically, the lens unit 300 calculates an optimal GN using a distance to a subject measured in the AF operation in step S508 and reads a flash time associated with the calculated GN from the GN table in the RAM 315.

Then, the lens unit 300 transmits a flash start signal to the camera body 200 in step S524. The flash start signal is directly transmitted to the internal strobe 207 not via the main CPU 208. Receiving the flash start signal, the internal strobe 207 emits a flash in step S525. After transmitting the flash start signal, the lens unit 300 starts performing metering to an optical image of a subject and the photometer constituted by the imaging unit and the image processor in step S526.

The lens unit 300 counts a length of time from the transmittance of the flash start signal (step S524), and transmits a flash stop signal to the camera body 200 in step S527 when the count time reaches the calculated flash time in step S523. The internal strobe 207 stops flashing, receiving the flash stop signal.

In step S528 the lens unit 300 determines whether or not a result of the metering in step S526 is normal. When the result is not normal (No in step S528), the lens unit 300 increases a length of pre-flash time to increase the flash amount. Alternatively, it changes a setting such as increasing sensitivity of the image sensor in step S529 and transmits a flash start signal to the camera body 200 again to allow the internal strobe 207 to pre-flash in steps S524, S525.

Until a normal result of the metering in step S526 is obtained (Yes in step S528), the above processing is repeated. A normal result of metering signifies that a metering result in step S526 is sufficient to determine an actual flash amount (GN). That is, the lens unit 300 determines that the result is not normal when a light amount reflected from a subject by a pre-flash is too small to be compensated with the maximum light amount of the internal strobe 207, causing insufficient exposure.

In step S530 the lens unit 300 calculates a GN as an actual flash amount according to the result of metering in step S526 and calculates an actual flash time from the GN table in the RAM 315. In step S531 the lens unit 300 starts shooting operation. Concurrently with or after the start of the shooting operation, the flash start signal is directly transmitted from the lens unit 300 to the internal strobe 207 without the main CPU 208 of the camera body 200. Receiving the flash start signal, the internal strobe 207 emits a flash in step S532.

In the shooting operation of the lens unit 300 in step S531, the imaging unit outputs image data based on an optical image of a subject received via the optical system, and the image processor performs predetermined image processing to the image data to generate an image file, and transmits the image file to the camera body via the communication interface. The image file is stored in the camera body.

The lens unit 300 counts a length of time from the transmittance of the flash start signal, and transmits a flash stop signal to the camera body 200 in step S533 when the count time reaches the calculated flash time in step S517. Then, the internal strobe 207 stops flashing.

Thus, the camera device according to the present embodiment is configured to change a camera setting such as increasing sensitivity of the image sensor or a pre-flash time when a normal metering result is not obtained from a first pre-flash due to a long distance to a subject, and emit a pre-flash again. Thereby, a metering range can be shifted to a far distance side. A metering in a near distance is done with a first pre-flash and a metering in a far distance is done with a second pre-flash. In other words, flash control over a wider range can be realized. Accordingly, in shooting a subject in a far distance, the camera device according to the present embodiment can control, from the lens unit, the strobe to emit a pre-flash in conformity with the distance.

According to the camera device of the present embodiment, focal length data decided by specification of an optical system of a lens unit attached as well as a GN table necessary for optimal flash operation in accordance with a dynamic range of an image sensor are prepared for each lens unit (stored in the ROM 314). This makes it possible to optimally perform flash control over the strobe by each lens unit without complex data communication between the lens unit and the camera body after the lens unit is attached to the camera body.

Figure 13:
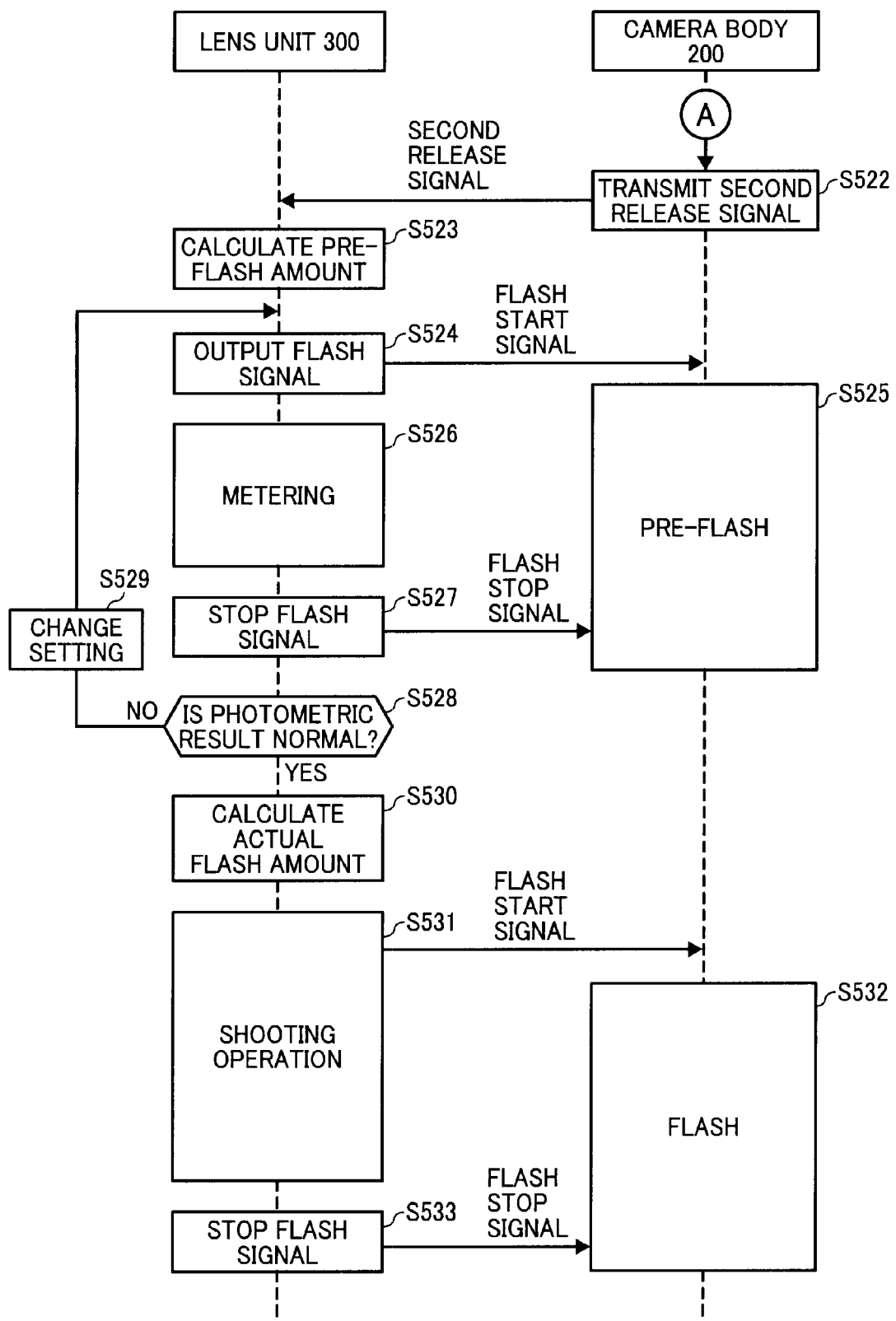
FIG. 13 is a sequence diagram for another example of the shooting operation.

Note that FIG. 13 shows an example of repetitively pre-flashing until a normal metering result is obtained. However, the upper limit number of pre-flashings can be set in advance, for example.

Sixth Embodiment

Next, another example of imaging method using the camera device will be described. In the present embodiment an external strobe is attached to the camera body of the camera device. In the flowchart of FIG. 9, when attachment of the external strobe 230 is determined (Yes in step S20), the second flash operation is performed in step S60 after the second initial setting in step S40.

FIGS. 14A to 14C show details of the second initial setting in FIG. 9. In FIG. 14A, first, GN data is transmitted from the camera body 200 to the lens unit 100 in step S401. The GN data is data on the external strobe 230 attached to the camera body 200. That is, the camera body according to the present embodiment stores GN data suitable for flash control over the external strobe 230 in advance. In step S402 the lens unit 100 reads the GN table in the ROM 114, updates the table with the transmitted GN data, and stores it in the RAM 115 in step S402.

Seventh Embodiment

Another example of the second initial setting is described with reference to FIG. 14B. In the present embodiment the external strobe 230 is configured to transmit GN data used for flash control of the external strobe 230 to the lens unit 100 (step S403). Specifically, GN data is pre-stored in a not-shown storage medium of the external strobe 230, and transmitted to the main CPU 208 via the external strobe interface 229. The main CPU 208 then transmits the GN data to the main CPU 103 of the lens unit 100 via the interfaces 223, 123. The lens unit 100 reads a GN table pre-stored in the ROM 114, updates the table with the transmitted GN data, and stores it in the RAM 115 in step S404.

Eighth Embodiment

Another example of the second initial setting is described with reference to FIG. 14C. As described above, the GN data is a value calculated by an F-number of the optical system and a subject distance. A necessary length of flash time associated with GN data is determined by specification of the strobe.

With the above taken into consideration, the present embodiment is configured that not the GN data pre-stored but strobe data of the external strobe 230 is transmitted from the external strobe 230 to the lens unit 100 in step S405. The lens unit generates GN data based on the strobe data in step S406, updates the table with the generated GN data, and stores it in the RAM 115 in step S407.

This makes it possible for the lens unit 100 to optimally perform flash control over any external strobe attached to the camera body by generating GN data from specification data of the strobe in use.

Ninth Embodiment

Next, the second flash operation after the second initial setting is described in detail with reference to FIG. 15. Detecting the first press (Yes in step S601), the camera body 200 transmits the first release signal to the lens unit 100 in step S602. After transmitting the first release signal, the camera body 200 repetitively performs the operation until it detects the second release signal (No in step S605).

Receiving the first release signal from the camera body 200, the lens unit 100 performs the AE and AF operations in step S603. Through the AF operation, a distance to a subject is measured to acquire distance data used in the flash amount calculation. The AE and AF operations are repeated (No in step S604). Upon completion of the AE and AF operations, the camera body 200 is notified thereof (Yes in step S604).

Receiving a notification of the completion and detecting the second press (Yes in step S605), the camera body 200 proceeds to the next processing. Without detection of the second press, the camera body 200 waits for the detection.

Tenth Embodiment

Figure 15:
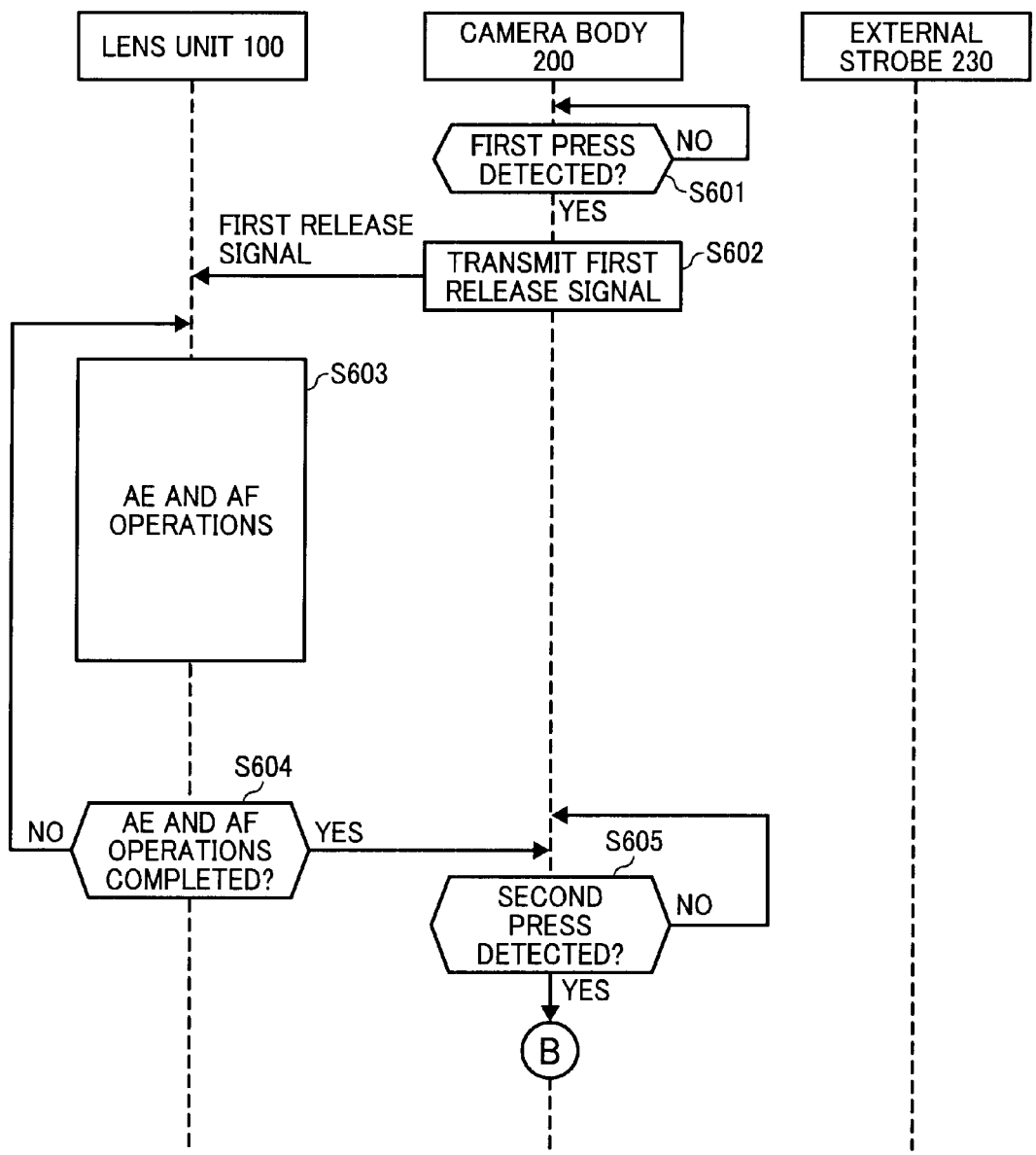
FIG. 15 is a sequence diagram for another example of the flash operation.
Figure 16:
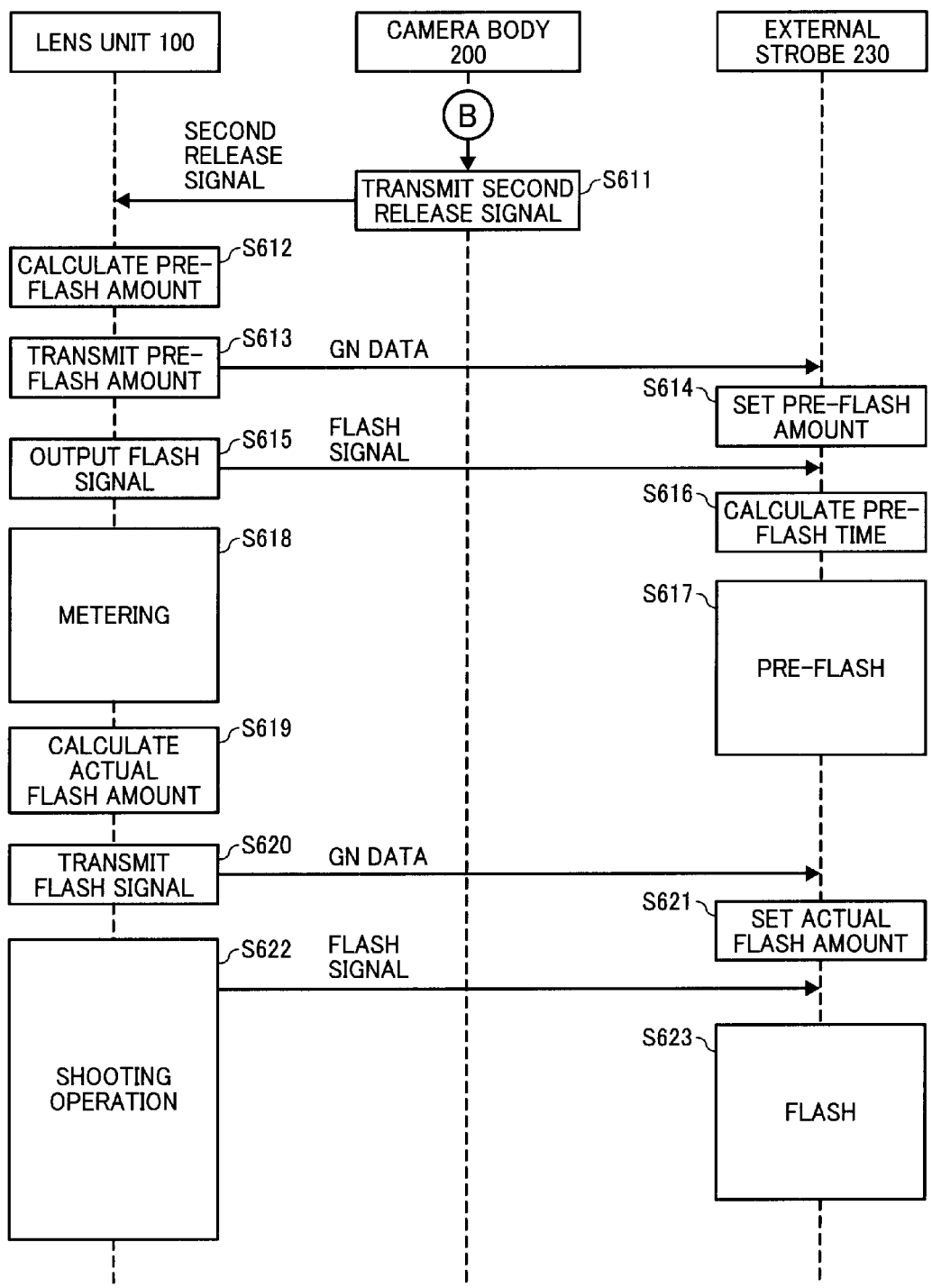
FIG. 16 is a sequence diagram for a still another example of the shooting operation.

A process following step S605 of FIG. 15 is described with reference to FIG. 16. In step S611 the camera body 200 transmits the second release signal to the lens unit 100, detecting the second press.

The lens unit 100 calculates a pre-flash amount according to the second release signal in step S612. Specifically, an appropriate GN is calculated from the GN table in the RAM 115, using distance data measured in the AF operation (step S603) as described above.

Then, the lens unit 100 transmits the calculated pre-flash amount as GN data to the external strobe 230 via the main CPU 208 of the camera body 200 in step S613. The external strobe 230 stores the received GN data in a not-shown storage medium in step S614.

In step S615 the lens unit 100 transmits a flash signal to the external strobe 230. Receiving the flash signal, the external strobe 230 performs flash operation based on the transmitted GN data. That is, the external strobe 230 calculates a flash time from the transmitted GN data after receiving the flash signal in step S616 and pre-flashes for a calculated length of time in step S617.

After transmitting the flash signal, the lens unit 100 acquires an optical image of a subject captured via the optical system 107 by a pre-flash and performs metering to the image with a photometer constituted by the imaging unit and the image processor in step S618.

In step S619 the lens unit calculates a GN for an actual flash amount from a metering result in step S618, and transmits GN data to the external strobe 230 via the main CPU 208 of the camera body 200 in step S620. The external strobe 230 calculates a flash time based on the transmitted GN data and sets an actual flash amount in step S621.

In step S622 the lens unit 100 starts shooting operation. Concurrently with or after the start of shooting operation, the lens unit 100 transmits a flash signal to the external strobe 230 in step S622. In step S623 the external strobe 230 emits a flash according to the set actual flash amount, receiving the flash signal.

According to the camera device in the present embodiment, the lens unit 100 can control pre-flash and actual flash of the external strobe 230 attached to the camera body 200.

Moreover, since the lens unit 100 is configured to include the optical system, the imaging unit having the image sensor, and the image processor, the camera device 3, unlike the prior art interchangeable lens type camera device, can prevent disadvantageous effects on image quality due to lens aberration or shading of the image sensor.

Further, according to the camera device in the present embodiment, the lens unit comprising the image processor can process image data of a subject alone. Accordingly, in shooting with use of a strobe, each lens unit can optimally control the flash operation of the strobe. Furthermore, in this camera device, provided with a flash control function is the lens unit which is interchangeable with a different lens unit with different properties. This makes it possible for the lens unit to optimally control a flash operation of the external strobe attached to the camera body used with different lens units.

Eleventh Embodiment

Next, another example of the processing in the tenth embodiment is described with reference to FIG. 17.

In the camera device according to one embodiment of the present invention, different lens units are attachable to a single camera body. In a case where a lens unit with a zoom lens is attached, it is necessary to perform flash control over the strobe in a longer distance since focal length is more variable and shooting distance is longer in such a lens unit than in a lens unit with a single focus lens. However, with use of an image sensor in a small dynamic range, a distance that it can measure from a pre-flash is short. And, it is very difficult to calculate an actual flash amount needed for a range of near to far distances from a single pre-flash, especially when the lens unit attached incorporates a high magnification zoom lens.

The present embodiment will describe an example of the camera device 3 including the lens unit 300 with a zoom function when an external strobe is attached thereto, which performs pre-flash control and metering a plurality of times while changing sensitivity of the pre-flash.

Detecting the second press in step S605 of FIG. 15, the camera body 200 of the camera device 3 according to the present embodiment transmits the second release signal to the lens unit 300 in step S631.

The lens unit 100 calculates a pre-flash amount according to the second release signal in step S632. Specifically, it determines an appropriate GN using a subject distance measured in the AF operation (step S603) and calculates a flash time associated with the GN from the GN table in the RAM 315 as described above.

Then, the lens unit 300 transmits the calculated GN data as a pre-flash amount to the external strobe 230 via the main CPU 208 of the camera body 200 in step S633. The external strobe 230 stores the received GN data in a not-shown storage medium in step S634.

In step S635 the lens unit 100 directly transmits a flash signal to the external strobe 230 without the main CPU 208 of the camera body 200. Receiving the flash signal, the external strobe 230 performs flash operation based on the transmitted GN data. That is, the external strobe 230 calculates a flash time from the transmitted GN data after receiving the flash signal in step S636 and pre-flashes for a calculated length of time in step S637.

After transmitting the flash signal, the lens unit 100 starts performing metering to an optical image of a subject captured via the optical system 107 by a pre-flash with a photometer constituted by the imaging unit and the image processor in step S638.

In step S639 the lens unit 300 determines whether or not a result of the metering in step S638 is normal. When the result is not normal (No in step S639), the lens unit 300 changes a setting such as increasing the GN value in step S632 or increasing sensitivity of the image sensor in step S640. It transmits the pre-flash amount to the external strobe 230 again in step S633.

Until a normal result of the metering in step S639 is obtained, the above processing is repeated. In step S641 the lens unit 300 calculates a GN for an actual flash amount from a metering result in step S639, and transmits GN data to the external strobe 230 via the main CPU 208 of the camera body 200 in step S642. The external strobe 230 calculates a flash time based on the transmitted GN data and sets an actual flash amount in step S643.

In step S644 the lens unit 300 starts shooting operation and transmits a flash signal to the external strobe 230. In step S645 the external strobe 230 emits a flash according to the set actual flash amount.

Thus, the camera device including the lens unit with a zoom lens according to the present embodiment is configured to change a camera setting in such a manner as to increase sensitivity of the image sensor and/or a pre-flash time when a normal metering result is not obtained from a first pre-flash, and to emit a pre-flash again. Thereby, a metering range can be shifted to a far distance side even with use of an external strobe. This makes it possible to perform a metering in a near distance by a first pre-flash and in a far distance by a second pre-flash, achieving flash control in a wider range. In other words, in shooting a subject in a far distance, the camera device according to the present embodiment can control, from the lens unit, the strobe to emit a pre-flash in conformity with the distance.

Note that FIG. 17 shows an example of repetitively pre-flashing until a normal metering result is obtained. However, the upper limit number of pre-flashings can be set in advance, for example.

According to the camera device in the present embodiment, focal length data decided by specification of an optical system of a lens unit attached as well as a GN table necessary for optimal flash operation in accordance with a dynamic range of an image sensor are prepared for each lens unit. This makes it possible for each lens unit to optimally perform flash control over the strobe without complex data communication between the lens unit and the camera body after the lens unit is attached to the camera body.

Twelfth Embodiment

Now, another example of the camera device 3 is described. The camera device 3 is configured that a replaceable camera body is attached to a common lens unit 1. Normally, a different lens unit is attached to a common camera body 2 to constitute the camera device 3 so that the lens unit 1 containing a software program to control an internal strobe can control flash operation of the internal strobe of the camera body 2.

However, in replacing a camera body attached to the lens unit 1, the software program in the lens unit 1 needs to conform to the property of the internal strobe 207 of the camera body 2 in use because the maximum guide number (GN) or color temperature differs depending on a kind of the internal strobe 207.

In view of the above, the camera device is configured to include another storage medium as a first storage medium in the camera body 2 in which data on the internal strobe 207 is stored. At power-on of the camera device, the strobe data is transmitted to the lens unit 1 and the lens unit 1 performs flash control of the internal strobe 207 using the transmitted strobe data. Therefore, according to the camera device 3 in the present embodiment, the lens unit 1 can optimally control the flash operation of the internal strobe 207 of the camera body 2 based on the color temperature or angle of light distribution of the internal strobe 207.

As described in the above embodiments, in the camera device the lens unit can perform an optimal flash control over the strobe in accordance with the property of the lens unit. Moreover, the lens unit can perform an optimal flash control over the strobe in accordance with the property of the lens unit and the property of the strobe. Further, the camera device can differently perform flash control of the internal strobe and the external strobe in respective suitable manners.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A lens unit for detachable connection via a communication interface with a camera body having a strobe, comprising:
   an optical system including a lens;
   an imaging unit including an image sensor which photoelectrically converts light from a subject having transmitted through the lens;
   an image processor which generates image data from an output of the imaging unit;
   a strobe controller which controls a flash operation of the strobe provided in the camera body in accordance with a release signal from the camera body; and
   a storage medium in which operation control data for controlling the flash operation of the strobe is stored, the operation control data including data indicating a flash condition,
   wherein the strobe controller comprises:
      a data reader which reads the operation control data from the storage medium;

a calculator which calculates a flash output from the read operation control data; and a flash signal transmitter which transmits flash information to the camera body based on the flash output which has been calculated.

2. A lens unit according to claim 1, wherein:

the operation control data includes data indicating the flash condition of the strobe determined according to a property of the strobe; and the strobe controller reads the operation control data from the storage medium to control the flash operation of the strobe based on the read operation control data which includes the property of the strobe.

3. A lens unit according to claim 1, wherein:

the calculator calculates the flash output as a flash time of the strobe from the read operation control data in accordance with the release signal, and the flash signal transmitter transmits the flash information to the camera body which is a flash start signal and a flash stop signal to the camera body based on the calculated flash time, the flash start signal instructing the strobe to start flashing, the flash stop signal instructing the strobe to stop flashing.

4. A lens unit according to claim 1, the calculator calculates a guide number from the read operation control data in accordance with the release signal, and the flash signal transmitter transmits, to the camera body, the guide number and a flash start signal instructing the strobe to start flashing.

5. A lens unit according to claim 1, further comprising a photometer which measures an amount of a pre-flash of the strobe prior to a shooting operation, wherein the strobe controller is configured to instruct the strobe to emit a pre-flash based on a result of the measurement by the photometer.

6. A lens unit according to claim 5, wherein a maximum number of times at which the pre-flash is emitted is set to be larger when the strobe is an external strobe than when the strobe is an internal strobe.

7. A lens unit according to claim 1, wherein the strobe is an external strobe attached to the camera body.

8. A camera device comprising:

the lens unit according to claim 1; and the camera body.

9. An imaging method using a camera which comprises a lens unit and a camera body detachably connected with the lens unit comprising the steps of:

receiving, by the lens unit, operation control data from the camera body;

updating operation control data stored in the lens unit to the operation control data received from the camera body;

reading the updated operation control data;

calculating, in the lens unit, a flash time of a strobe based on the read operation control data;

transmitting, to the camera body, a flash start signal to instruct the strobe to start flashing according to the calculated flash time; and transmitting, to the camera body, a flash stop signal to instruct the strobe to stop flashing when the calculated flash time has elapsed.

10. An imaging method according to claim 9, further comprising the steps of:

calculating, by the lens unit, a guide number of the strobe based on the read operation control data; and transmitting the calculated guide number and the flash start signal to the camera body.

11. An imaging method according to claim 9, wherein:

the operation control data received by the lens unit is associated with a property of the strobe.

12. An imaging method according to claim 9, further comprising the step of:

measuring, by the lens unit, an amount of light emitted from the strobe, wherein the transmitting of the flash stop signal in performed according to a result of the measuring.

* * * * *